United States Patent [19]

Paquet

[11] Patent Number: 5,743,073
[45] Date of Patent: Apr. 28, 1998

[54] AUTOMATIC FORAGE HARVESTER KNIFE SHARPENING METHOD USING FIRST AND SECOND SPEED RATIOS

[75] Inventor: Bert Juul Frans Paquet, Sint-Andries, Belgium

[73] Assignee: New Holland North America, Inc., New Holland, Pa.

[21] Appl. No.: 625,449

[22] Filed: Mar. 28, 1996

[30] Foreign Application Priority Data

Mar. 31, 1995 [GB] United Kingdom ............ 95 06 692.4

[51] Int. Cl.⁶ .................................................. A01D 75/10
[52] U.S. Cl. .................... 56/12.1; 56/250; 56/10.2 G; 56/7; 241/101.2; 241/222
[58] Field of Search .................. 56/12.1, 10.2 R, 56/10.2 G, 10.2 H, 249, 249.5, 250, 294, DIG. 2, 7; 241/101.2, 241, 101.71; 451/241

[56] References Cited

U.S. PATENT DOCUMENTS

| | | | |
|---|---|---|---|
| 3,863,403 | 2/1975 | Fleming | 56/250 X |
| 3,889,887 | 6/1975 | Wagstaff et al. | 56/250 X |
| 3,991,525 | 11/1976 | Oswald | 56/250 X |
| 4,010,576 | 3/1977 | Nissen | 56/250 X |
| 4,019,287 | 4/1977 | Goering et al. | 56/250 X |
| 4,321,773 | 3/1982 | Fleming | 56/250 X |
| 4,746,330 | 5/1988 | Johnson | 56/250 X |
| 4,834,303 | 5/1989 | McClure et al. | 241/101.2 |
| 4,991,476 | 2/1991 | Chow et al. | 241/101.2 |
| 5,098,027 | 3/1992 | McClure et al. | 241/101.2 |
| 5,103,622 | 4/1992 | Hall et al. | 56/250 |

FOREIGN PATENT DOCUMENTS

| | | |
|---|---|---|
| 0242464A1 | 10/1987 | European Pat. Off. . |
| 0427297A2 | 5/1991 | European Pat. Off. . |
| 0444916A1 | 9/1991 | European Pat. Off. . |
| 1411794 | 10/1975 | United Kingdom . |
| 2028191 | 3/1980 | United Kingdom . |

*Primary Examiner*—Terry Lee Melius
*Assistant Examiner*—Victor Batson
*Attorney, Agent, or Firm*—John W. Stader; Frank A. Seemar; Larry W. Miller

[57] ABSTRACT

A forage harvester is provided with a rotatable cutterhead (9), a solid cylindrical grinding stone (15), a motor (33) for moving the stone (15) along a path adjacent the cutterhead (9) and an adjustment mechanism for moving the stone (15) towards the cutterhead (9). During the final stage of the sharpening cycle the stone (15) is automatically moved along the path at a substantially lower speed in order to improve the finishing of the cutterhead (9), such that the shearbar (11) can be adjusted closer to the rotating cutterhead (9).

10 Claims, 6 Drawing Sheets

AUTOMATIC FORAGE HARVESTER KNIFE SHARPENING METHOD USING FIRST AND SECOND SPEED RATIOS

FIELD OF INVENTION

This invention relates generally to a method for automatically controlling the sharpening of cutterhead knives in a forage harvester. More particularly, the invention provides improvements in cutterhead knife sharpening systems of the type disclosed in U.S. Pat. No. 5,098,027, issued Mar. 24, 1992 in the name of John R. McClure, et al, and assigned to a common assignee.

BACKGROUND OF THE INVENTION

In U.S. Pat. No. 5,098,027 there is disclosed a knife sharpening apparatus for sharpening the cutterhead knives in a forage harvester. This apparatus includes a sharpening stone that is driven back and forth along guide members adjacent a rotating cutterhead to sharpen the knives thereof, the knives traversing a path which defines a cylinder. A control circuit is provided so that an operator may control the sharpening operation by operating switches in the cab of the forage harvester.

This apparatus is equipped with an indexing mechanism for moving the sharpening stone downwardly by a small, fixed distance relative to the cutterhead every two strokes of the stone. Hence, the amount of material which is ground from the knives is substantially the same during every two strokes of the stone. The guide members receive the reaction forces on the stone and may be bent slightly upwardly in their middle portion if too much material has to be ground away at once. This results in a slightly barrel-shaped cutterhead, to which no straight shearbar can be adjusted uniformly within a very close range, whereupon efficient operation of the cutterhead-shearbar combination is not obtainable.

In order to provide a remedy thereto one can choose to adapt the indexing mechanism to remove only a very small amount of material during every two strokes, but this results in excessively long grinding intervals, which interrupt the normal harvesting operations.

Another solution is suggested by European Patent Application No. 90 122,721.5, filed in the name of Stanley J. Johnson on Mar. 28, 1989, Published May 15, 1991, in which the stone is movable by means of a motor, which can be used for advancing the stone towards the knives by smaller steps at the end of the sharpening cycle, such that the amount of ground material decreases accordingly. Such embodiment requires an additional motor and associate control means.

SUMMARY OF THE INVENTION

It is an object of the present invention to provide an automatic knife sharpening method for a forage harvester, which does not require additional mechanical components over those shown in above mentioned U.S. Pat. No. 5,098, 027, issued Mar. 24, 1992, while still provides a good finishing pass to the cutterhead in order to enable a close and even shearbar adjustment.

According to the present invention there is provided a method of sharpening a cutterhead in a forage harvester comprising a rotatable cutterhead (9), cutterhead sharpening means (15), means (33) for moving the sharpening means (15) along a path adjacent the cutterhead (9) and means for moving the sharpening means (15) towards the cutterhead (9), the method comprising the steps of, rotating the cutterhead (9) at a rotational speed; and moving the sharpening means (15) back and forth along the path at a first speed ratio versus the cutterhead speed, wherein the improvement comprises the further step of, moving the sharpening means (15) at least once along the path at a second speed ratio versus the cutterhead speed.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE PREFERRED EMBODIMENT

Figure 1:
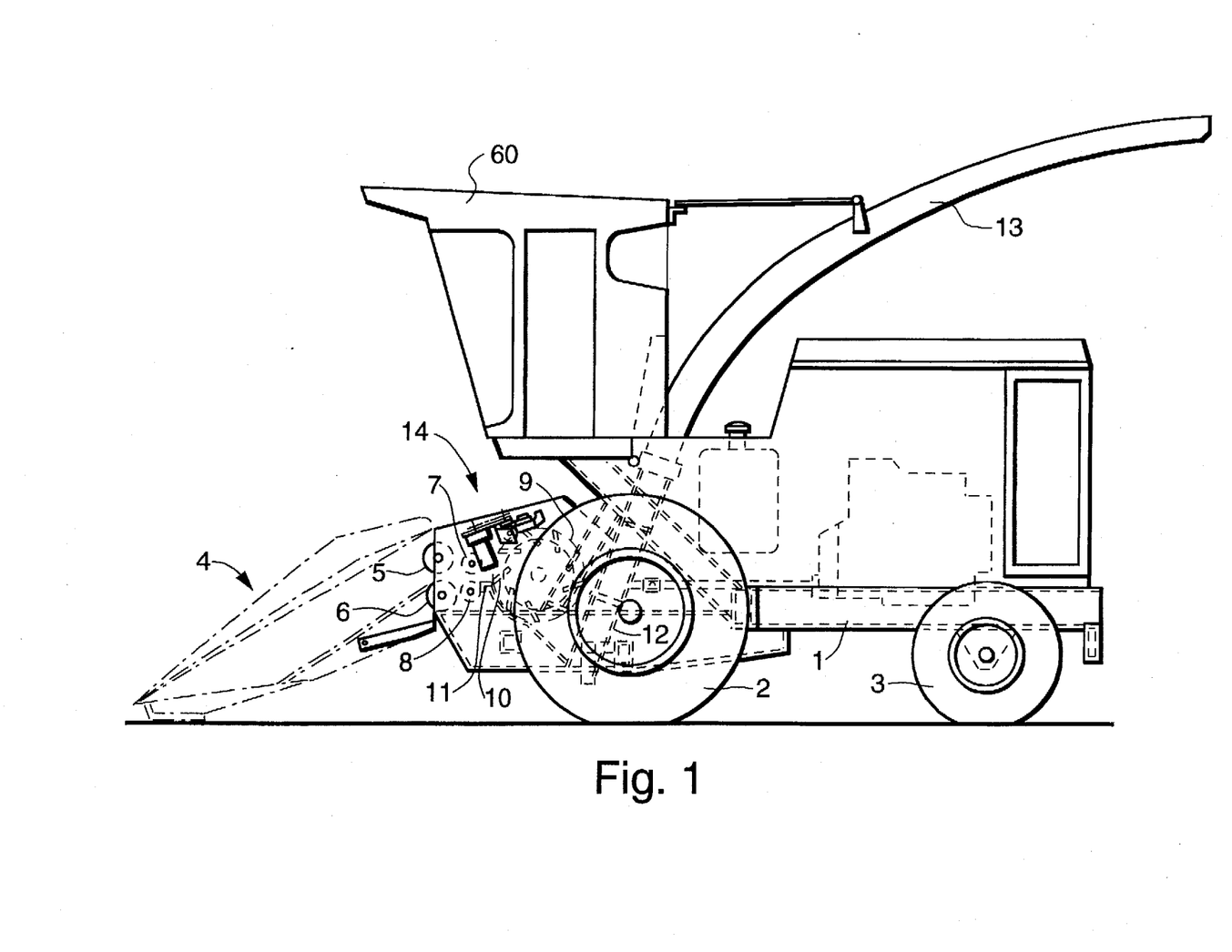
FIG. 1 is a diagrammatic side view of a forage harvester in which the invention is embodied.
Figure 2:
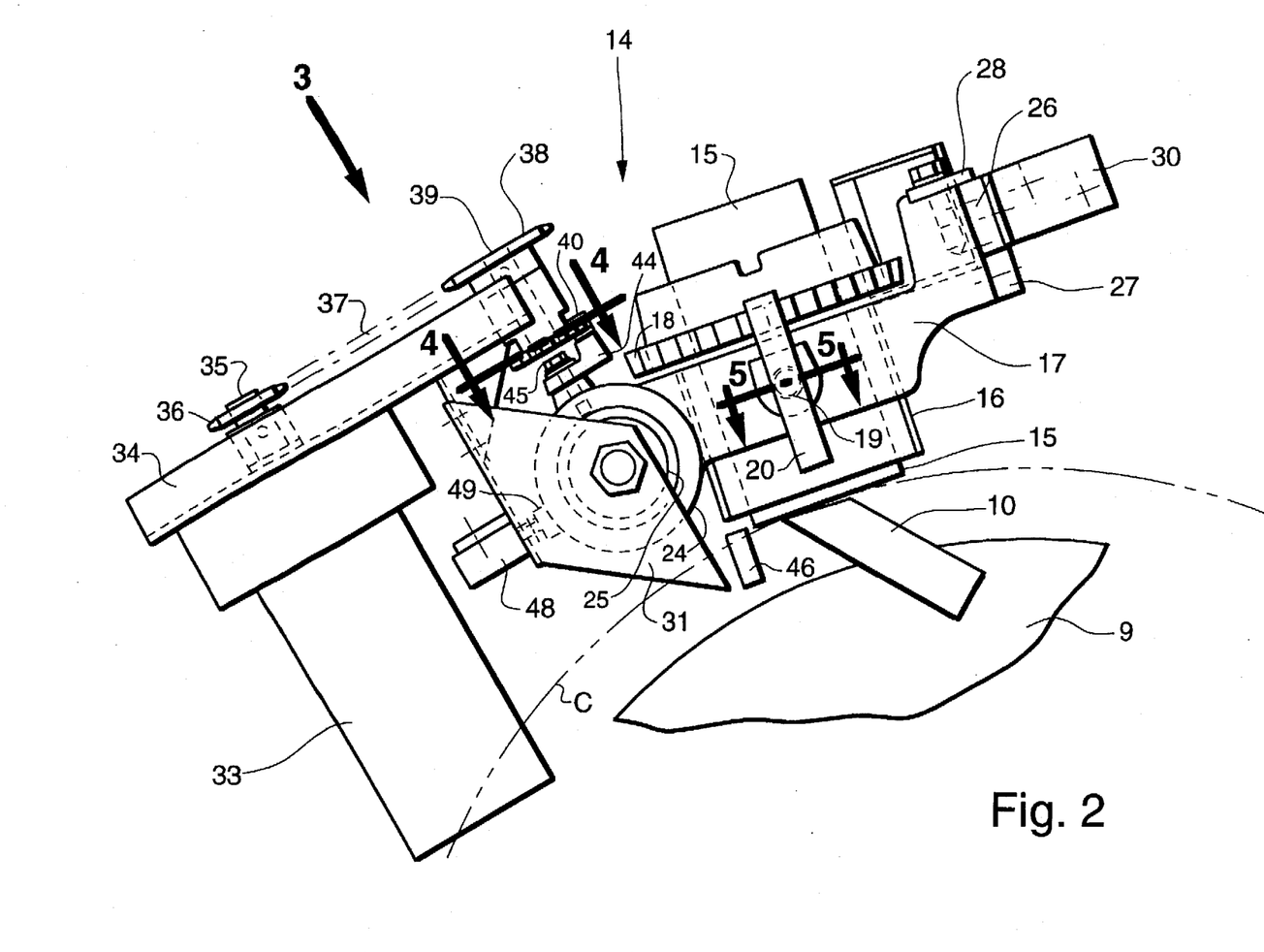
FIG. 2 is a diagrammatic side view of a mechanism for sharpening the knives of a forage harvester.
Figure 3:
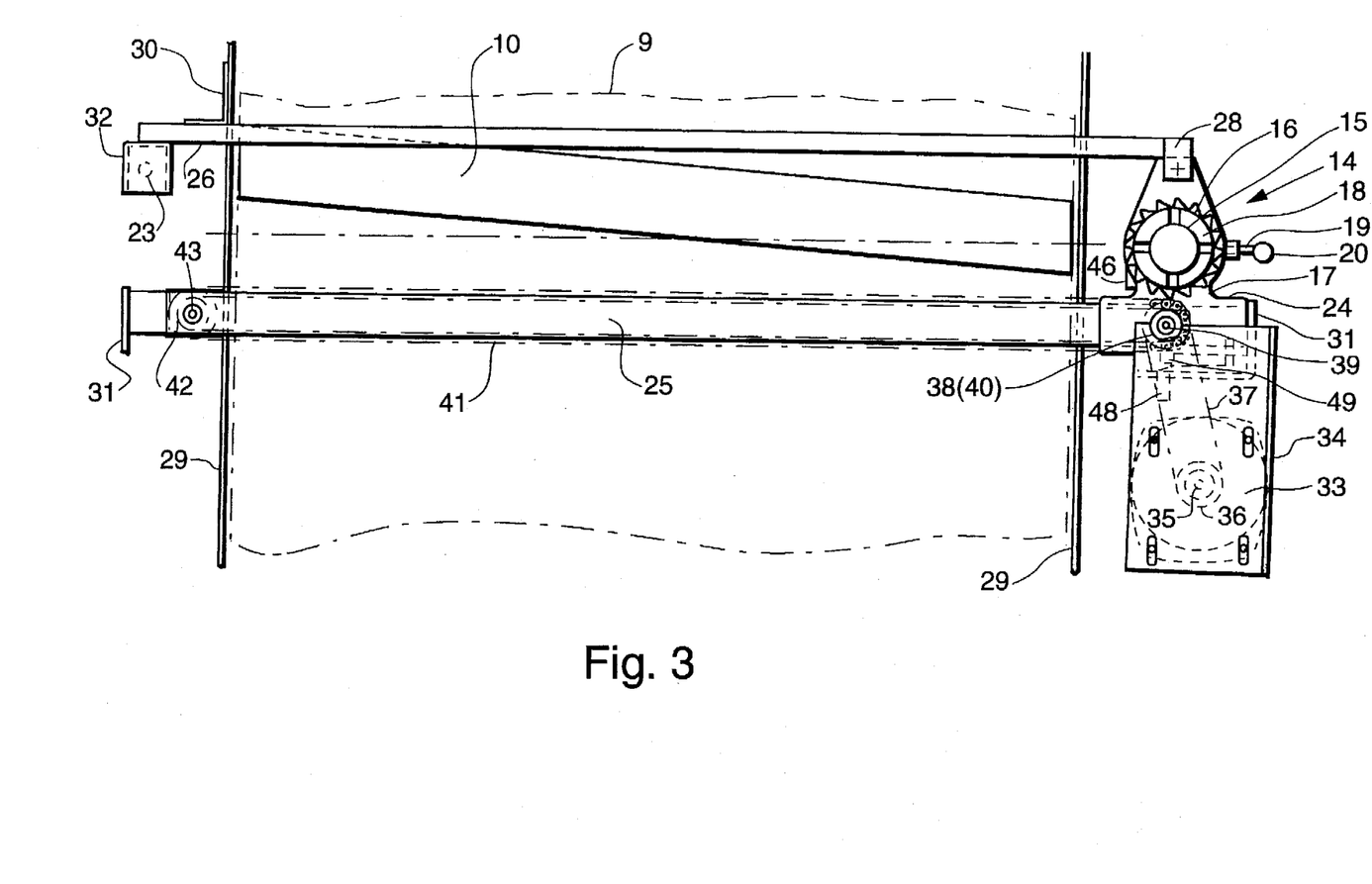
FIG. 3 is a view in the direction of arrow III of FIG. 2 in reduced scale.
Figure 4:
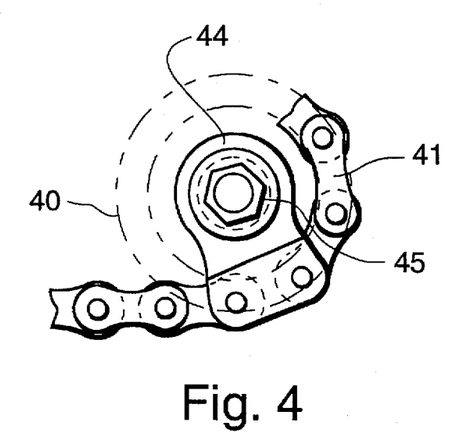
FIG. 4 is a sectional view taken along line IV—IV of FIG. 2.

FIGS. 1–3 illustrate a forage harvester and knife sharpening system as disclosed in EP-A-0.444.916. The forage harvester comprises a main frame 1 on which are mounted ground-engaging wheels 2 and 3 and which is fitted with a corn header 4 (shown in phantom). The forage harvester includes upper and lower forward feed rolls 5 and 6 followed by upper and lower rear feed rolls 7 and 8 which operate to feed crop material from the header 4 into a conventional cutterhead 9, the knives 10 of which cooperate with a fixed shearbar 11 fitted on the lower edge of a cutterhead inlet opening. The outlet of the cutterhead housing communicates with the inlet of a blower 12, the outlet of which is fitted with the normal discharge spout 13 which can be positioned by the operator to direct the cut crop material as required, normally into a wagon which is moving alongside the harvester or in some instances is pulled behind the harvester.

Figure 5:
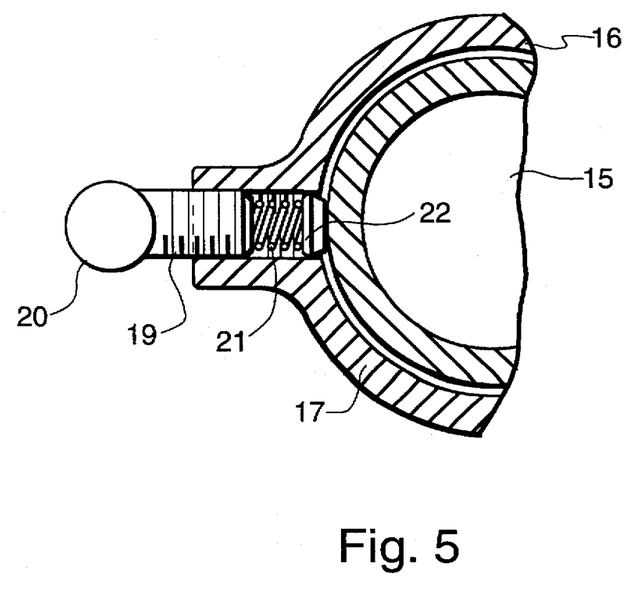
FIG. 5 is a sectional view taken along line V—V of FIG. 2.

The cutterhead 9 is fitted with a knife grinding or sharpening mechanism, indicated generally at 14 (FIG. 2), the main components of this device including a solid cylindrical grinding or sharpening stone 15 adjustably mounted within a barrel 16 which is externally threaded and is received by a threaded aperture in a carriage 17 for the sharpening stone. The upper end of the barrel 16 is fitted with a toothed indexing ring 18 and an aperture is provided through the carriage 17, the aperture being threaded for receiving a threaded rod 19 fitted with a handle 20. The rod 19 acts, via a spring 21 (FIG. 5), upon a plastic insert 22 and presses it into engagement with the external threads of the barrel 16. When the spring 21 is suitably compressed by rotating the rod 19 using the handle 20, the insert 22 is pressed on to the barrel threads so as to prevent inadvertent rotation of the barrel 16. The action of the insert 22 is such that it prevents inadvertent movement of the barrel 16 due to vibration but in no way prevents the rotation of the barrel 16 as a result of the operation of the indexing mechanism for the stone 15 which is effected after every two strokes of the stone or carriage 17 relative to the cutterhead 9. The indexing mechanism comprises the indexing ring 18 and a trip device 23 (FIG. 3) which is mounted on one of the guide rails for the carriage 17. As the toothed ring 18 engages the trip member 23 every two strokes of the carriage 17, the ring 18, and hence the barrel 16, is rotated substantially one tooth width and thus the stone 15 is moved downwardly by a small distance relative to the cutterhead 9 so as to compensate for wear of the stone during the sharpening or grinding action of the last two strokes of the mechanism.

The carriage 17 has a collar 24 which receives a guide rod 25 of circular cross-section via bearings (not shown) which facilitate movement of the carriage back and forth along this guide rod. A second guide 26 in the form of a rail or strip of metal of rectangular cross-section is provided and a roller 27 is provided on the carriage 17 to engage the underside of the guide rail 26. A guide plate 28 is provided on the carriage 17 and slidably engages the top of the guide rail 26. The rectangular guide rail 26 is mounted on the sidewalls 29 of the cutterhead housing by respective L-shaped brackets 30, whereas the circular guide rod 25 is mounted on L-shaped brackets 31 attached to the side walls 29. As shown in FIG. 3, the trip mechanism 23 is mounted on a support 32 which is attached to the guide rail 26.

A DC motor 33 is mounted on a bracket 34 attached to one of the brackets 31 and an output shaft 35 of the motor carries a sprocket 36 which is connected via a chain 37 to a sprocket 38 mounted on a stub shaft 39 journalled in the bracket 34 and carrying a further sprocket 40 below the bracket 34. The sprocket 40 receives a chain 41 extending around a second sprocket 42 mounted on a stub shaft 43 journalled in a support bracket on the corresponding bracket 31. It will be seen that the chain 41 extends across the full width of the cutterhead 9, with the sprockets 40 and 42 being disposed outside the respective sidewalls 29 of the cutterhead housing and defining the extent of the two runs of the chain.

The chain 41 is coupled to the carriage 17 via a coupling member 44 which is a cast L-shaped member the outer end of one limb of which is attached between two links of the chain 41 with the other limb being pivotally attached to the collar 24 of the carriage 17. This pivotal attachment of the coupling 44 is by way of a bolt 45 and it should be noted that the pivot axis afforded by this bolt is substantially co-axial with the axis of rotation of the sprockets 40 and 42 when the carriage 17 is at one end or the other of a stroke. In the intermediate positions, the pivot axis afforded by the bolt 45 is parallel to the axes of rotation of the sprockets 40 and 42 and actually tracks or follows a line joining the centers of these two sprockets. This is a requirement because as the coupling 44 moves around sprockets 40, 42 when it reaches the same so as to undergo arcuate movement to move from one run of the chain 41 to another, bearing in mind that the chain moves continuously in the same direction, movement must not be imparted to the carriage 17 and lost motion is necessary. Once the coupling 44 has moved from one run of the chain 41 to the other, it again acts upon the carriage 17 and moves the latter back across the cutterhead 9 for its next grinding stroke.

An electrical stone sensor 46 is disposed adjacent the lower end of the barrel 16 at the side of the machine at which the motor 33 is disposed, the sensor 46 being constituted by a NAMUR sensor, which is actuated by the lower end of the barrel 16 when the latter is indexed to a level close to the sensor 46. When this occurs, the signal from the sensor 46 is fed to electrical circuitry (not shown), wherein a microprocessor is loaded with a program in accordance with FIG. 6, which causes an alarm to be actuated, thereby indicating that the stone 15 needs replacement or readjustment relative to the barrel 16. When stone adjustment has to be carried out, the barrel 16 is rotated in a direction opposite to the indexing movement and the stone 15 is moved further into the barrel so as to expose a certain length of stone for further grinding operations.

A home/park sensor 48 is provided adjacent the collar 24 of the carriage 17 at the side of the machine at which the motor 33 is disposed and is actuated by an extension 49 on the collar. This sensor is equally constituted by a NAMUR sensor, linked to said micro-processor-controlled electrical circuitry. Each time the carriage 17 returns to the side of the machine at which the motor 33 is disposed, the home/park sensor 48 is actuated and signals to said microprocessor that the carriage 17 is in its home position.

When the sharpener drive motor 33 is energized as subsequently explained with reference to FIG. 6, the output shaft 35 is continuously rotated in one direction, whereby the sprocket 36 is driven in the same direction and thus drives the chain 37 continually. In turn, the sprocket 38 is driven by the chain 37 and this rotates the stub shaft 39 and hence the sprocket 40 mounted thereon. The sprocket 40 drives the chain 41 continuously and in the same direction with the sprocket 42 serving as an idler. As soon as the chain 41 is driven, it carries with it the coupling 44 and thus the carriage 17 is moved from the home or park position illustrated in FIG. 3, across the cutterhead 9 (to the left as seen in FIG. 3), whereupon the knives 10 engage the sharpening stone 15 (as the cutterhead rotates), whereby they are ground or sharpened. The carriage 17 continues to move across the cutterhead 9 until the coupling 44 reaches the sprocket 42 and it then has to pass therearound so as to move from one run of the chain to the other. As the coupling 44 is moving around the sprocket 42, no movement of the carriage 17 takes place as already explained but because the stone 15 is located outside of the cutterhead housing sidewall 29, there is no contact between the still rotating cutterhead knives 10 and the stone 15. As soon as the coupling 44 has travelled around the sprocket 43, it proceeds to move along the opposite run of the chain 41 and thus carries the carriage 17 back across the cutterhead 9 to its original position, again the knives 10 engaging the stone 15 during this return pass of the carriage. As the coupling 44 returns to the sprocket 40, the extension 49 on the carriage collar 24 actuates the sensor 48 although this does not necessarily deenergize the motor 33 as will be explained later. The coupling 44 then proceeds to pass around the sprocket 40, assuming there is another pass of the stone to be made, the carriage 17 again pausing while this movement of the coupling around the sprocket 40 takes place. Thus the coupling 44 moves back to its original run of the chain 41 and then commences to take the carriage 17 back across the cutterhead 9, and so on. This continual movement of the grinding stone 15 back and forth across the cutterhead 9 continues until such time as the grinding operation is to be stopped.

When the carriage 17 undergoes the first described traverse across the cutterhead 9, the trip device 23 engages a tooth of the indexing ring 18 and thus rotates that ring through approximately one tooth width and hence indexes the stone barrel 16 so as to move the operative face of the stone 15 slightly closer to the cylinder described by the tips of the knives 10, the stone 15 traversing a line on the periphery of the cylinder substantially parallel to the axis of rotation of the cutterhead 9. This indexing operation occurs every time the carriage 17 moves to the left-hand side (as seen in FIG. 3 of the drawings), i.e. at the end of every two strokes of the grinding mechanism.

As explained above the stone sensor 46 and the home sensor 48 are linked to microprocessor-controlled electrical circuitry, which also comprises means for supplying driving power to the motor 33. These power means are constituted by one or more SMARTFETs, which are controlled by the micro-processor to supply a continuous or a hacked current to the motor 33. In the latter case, the motor 33 will be driven at a reduced speed when compared to the continuous current operation. The SMARTFETs are operable to engender a feedback signal to the microprocessor when the actuation of these components engenders no flow of current to the DC motor 33 and in cases of excessive current and overheating. No flow of current may be related to an open circuit, such as caused by a broken wire. An excessive current may be related to a short circuit or to mechanical blocking of the motor 33.

The electrical circuitry also comprises operating switches on a control panel (not shown) for enabling the operator to control all operations on a control panel accessible from his driving position in the operator's cab 60. The operating switches comprise switches for selecting a 1-, 2- or 3-minute sharpening cycle and a STOP switch for a manual interrupt of the sharpening operation.

The control panel further comprises alarm devices, which may be visual, such as the lighting of LEDs or a warning message on the display of a monitor, or auditive, such as a buzzer or a horn. These components are equally controlled by the microprocessor and incorporated into said electrical circuitry.

The rotational speed (RPM) of the cutterhead 9 is monitored by a NAMUR sensor, which is disposed adjacent a protrusion on the rotating axis of the cutterhead 9 so as to produce output pulses at a rate proportional to the rate of rotation of the cutterhead. These pulses are equally fed to the microprocessor via the electrical circuitry. This sensor and the other NAMUR sensors may also be constituted by another magnetic variable reluctance, Hall-effect or similar devices or by switches.

Figure 6:
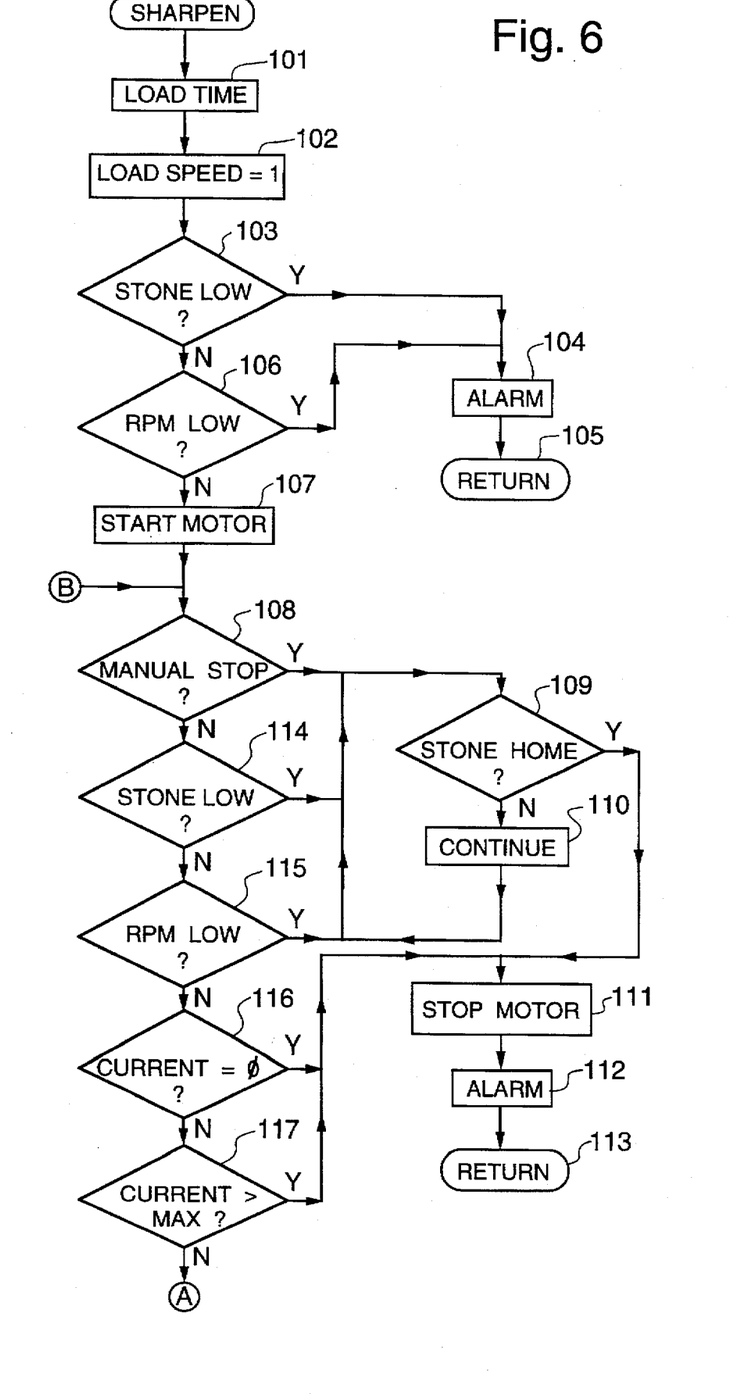
FIGS. 6 and 7 depict a logical flow diagram illustrating the steps performed by a system for controlling the sharpening mechanism of FIG. 2.
Figure 7:
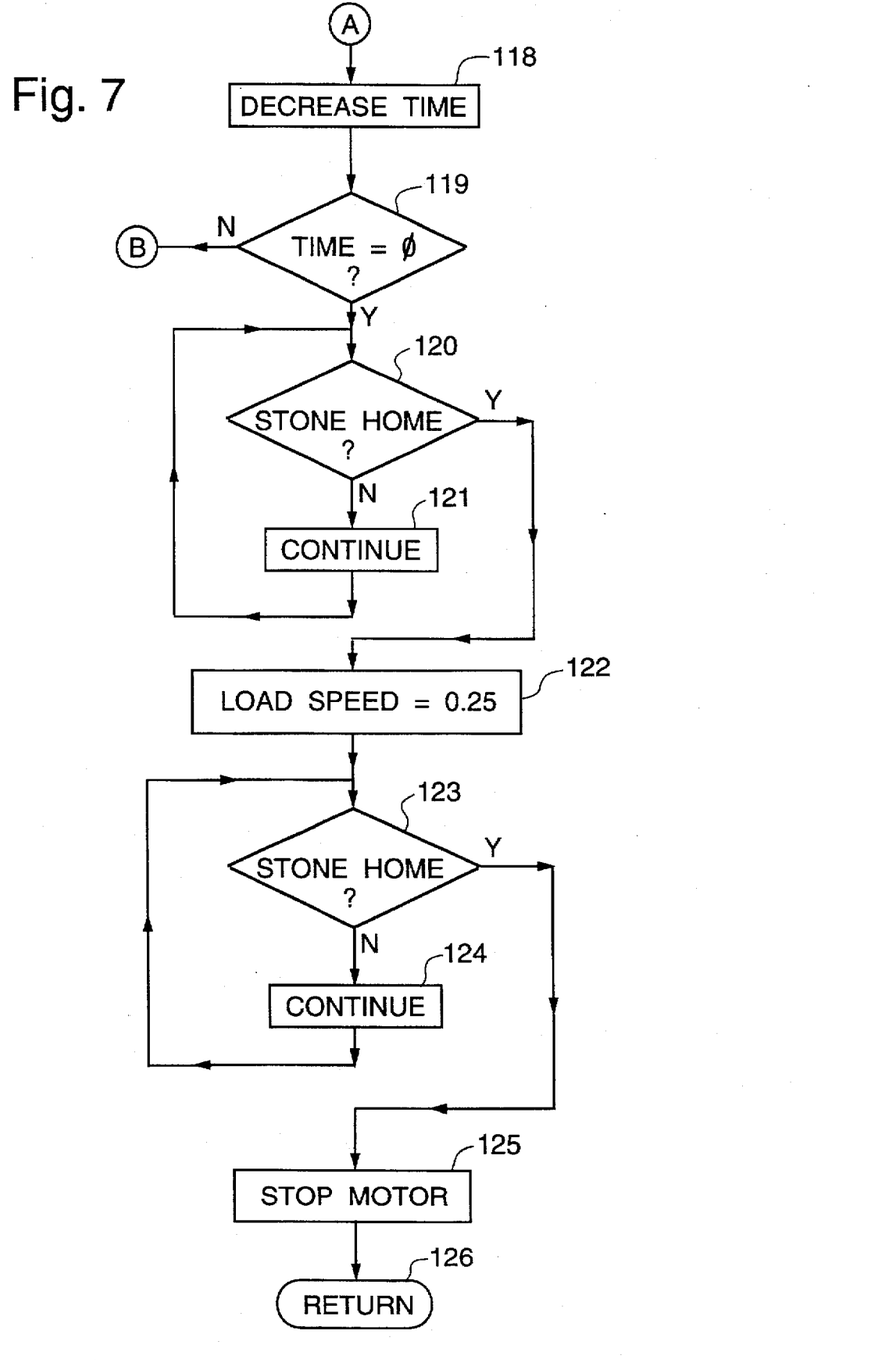

FIGS. 6 and 7 illustrate the operation of the knife sharpening system according to the invention, as performed by the program loaded into the microprocessor. This program comprises a routine SHARPEN, which is called from a MAIN routine (not shown) on selection by the operator of one of sharpening cycle switches on the control panel. At step 101 an address in a RAM memory of the electrical circuitry is loaded with a variable TIME which is representative of the selected cycle time. The program advances to step 102 in which a variable SPEED is loaded with the numerical value 1. The variable SPEED will be used later in determining the ratio of the motor actuation time versus the lapsed time. At a value 1 there is a constant supply of current towards the motor 33, at a value 0.25 the current supply is hacked such that current is fed to the motor during only a quarter of each cycle. The SMARTFETs thus can be used for generating a Pulse-Width-Modulated current to the motor 33.

At step 103 the program checks the input from stone sensor 46. This sensor 46 is actuated by the lower end of the barrel 16, when the stone 15 has been lowered so much by the indexing mechanism that it needs replacement or readjustment relative to the barrel 16. When such low position has been detected, the program advances to step 104, in which a buzzer is sounded and a warning message may be displayed on the monitor. In a further step 105 the program returns to the MAIN routine.

In case the sensor 46 is not actuated, the program advances from step 103 to 106, in which the rotational speed of the cutterhead 9 is compared to a threshold value. This speed is established in a separate RPM routine (not shown), which continuously counts the number of pulses, generated by the NAMUR sensor adjacent its rotating axis during a predetermined time interval. In case the number of pulses is below said threshold value, the cutterhead 9 is not up to the predetermined rate of rotation necessary for proper knife sharpening: since the time for sharpening the knives is fixed as explained above, proper knife sharpening requires that the cutterhead be rotating at least at some predetermined rate. Otherwise no adequate knife sharpening can take place within the selected time interval.

The program then proceeds to steps 104 and 105 to sound a buzzer, display a warning message to the operator and return to the MAIN routine. Hereby the operator is asked to increase the speed of the cutterhead 9, e.g. by engaging a clutch in the cutterhead drive line or by speeding up the engine of the forage harvester.

In case the cutterhead 9 is up to speed, the program advances to step 107, at which the SMARTFETs are actuated for driving the motor 33. As the variable SPEED is set to 1, there is a continuous supply of current to the motor 33.

At the next step 108, the program checks whether the operator is giving a manual stop command via the STOP switch on the control panel. In case he is, the program verifies at step 109 whether the home/park sensor 48 is actuated to indicate that the carriage 17 is in its home position. Assuming the sensor 48 is not actuated, the program proceeds to step 110 in which the motor 33 is still driven for moving the carriage 17 along the cutterhead 9, and then returns to the home test step 109. This loop is repeated until the carriage 17 reaches its home position, thereby actuating the sensor 48. The program then advances to step 111 for deactivating the SMARTFETs and halting the motor 33, while the carriage 17 is in its home position, next to the cutterhead sidewall 29. A message may be displayed to the operator at step 112 and the program returns to the MAIN program at step 113.

When no manual stop command is detected at step 108, the input from stone sensor 114 is checked in the same manner as at step 103 in order to see whether adjustment of the stone 15 is required. In case the stone sensor 46 is actuated, the program jumps to the loop 109-110, during which the movement of the carriage 17 is continued until the latter reaches its home position. As described above the motor 33 is then stopped at step 111. As at step 104 a buzzer may be sound and a warning message, saying that the stone 15 needs adjustment or replacement, may be displayed to the operator at step 112.

In case the stone sensor 46 is not actuated, the program advances from step 114 to step 115, at which the cutterhead RPM test of step 106 is repeated. If the rotational speed of the cutterhead 9 is below the minimum value, the program jumps equally to the loop 109-110 and therefrom, when the carriage 17 has returned to its home position, to step 111 to stop the motor 33. At step 112 a buzzer may sounded and an RPM fault message may be displayed to the operator.

When the speed of the cutterhead 9 is above said minimal value, the status of the SMARTFETs is checked at steps 116 and 117. In case their feedback signal indicates no flow of current at step 116 or an excessive current at step 117, the program branches immediately to step 111 for deenergizing the SMARTFETs before any additional damage is caused to the motor 33 and its circuitry. At step 112 a buzzer is actuated and a warning message appears on the display.

When no motor or circuitry fault is detected at steps 116 and 117, the program advances to step 118, at which the variable TIME is decremented. At the next step 119 this value is compared to 0 in order to see whether the full selected cycle time has lapsed. In case it has not, the programs branches back to step 108 to form a loop 108, 114–119 which is executed repeatedly until a manual stop command is detected at step 108, a bad operation condition is encountered at one of the steps 114–117 or until the cycle time has lapsed. Meanwhile the motor 30 keeps moving the sharpening stone adjacent the cutterhead 9 and at the end of every two strokes of the grinding mechanism 14, the indexing mechanism is operated to advance the stone 15 towards the cutterhead 9.

At the end of the selected cycle time, the variable TIME is decremented to zero and test 119 proves true. The program advances to step 120, at which the position of the carriage 17 is tested in the same manner as at step 109. When the carriage 17 is not in its home position, as detected by means of home sensor 48, the program enters a loop 120–121, which is executed repeatedly and during which the motor 33 is still driven at full speed.

When the sensor 48 is actuated by the carriage 17 which has returned to its home position, the program advances to step 122, at which the variable SPEED is loaded with a value smaller than 1, e.g. 0.25. Consequently a hacked current is supplied to the motor 33, which now drives the stone 15 at a substantially reduced speed along the rotating cutterhead 9.

The program enters a loop 123–124, which is similar to the loop 120–121. As a result the grinding mechanism 14 makes two strokes at a slow speed along the cutterhead 9 until the carriage 17 is back in its home position. During these slow passes the stone 15 is getting more time to grind the edges of the knives 10, such that the material is removed more evenly and the reaction forces on the carriage guide members 25, 26 are reduced consequently. The path of the stone is now more rectilinear, such that the ground cutterhead 9 obtains a better cylindrical shape, which can be approached in a more accurate fashion by the shearbar 11. This shape thus permits a better adjustment of the shearbar 11 to the rotating cutterhead 9 in a further operation not described herein.

When the carriage 17 is back in its home position after two strokes, the test at step 123 proves true and the program advances to step 125, at which the SMARTFETs are deactivated to stop the motor 33. The grinding operation is now completed successfully and the program returns to the MAIN routine at step 126.

From the foregoing description it is seen that the present invention provides an improved method for accomplishing the sharpening of cutterhead knives. The sharpening method involves a step in which the motor 33 drives the stone 15 at full speed along the rotating cutterhead 9, followed by a finishing step in which the motor 33 drives the stone 15 at a reduced speed along the same. This operation is performed automatically under control of microprocessor.

While a preferred embodiment of the invention has been described in specific detail, it will be understood that various modifications and substitutions may be made in the described embodiment without departing from the scope of the invention as defined in the appended claims. For example, the logic may be embodied in discrete logic circuits instead of in a microprocessor program. The NAMUR sensors 46, 48 may be replaced with other types of sensors or switches, which are equally capable of detecting the proximity of a component of the sharpening system. It is also conceivable to move the stone 15 at a constant rate throughout the full sharpening cycle and to increase the rotational speed of the cutterhead 9 during the last stroke or strokes in order to obtain a smaller speed ratio of the stone 15 versus the cutterhead speed than during the previous strokes. In this case also each of the knives 10 is engaged substantially more times by the stone 15 than at the start of the sharpening operation, such that the knife material is ground in smaller portions and the reaction forces are reduced accordingly, such that the knives 10 are set more evenly.

Having thus described the invention, what is claimed is:

1. A method of sharpening a cutterhead in a forage harvester comprising a rotatable cutterhead (9), cutterhead sharpening means (15), means (33) for moving said sharpening means (15) along a path adjacent said cutterhead (9) and means for moving said sharpening means (15) towards said cutterhead (9), said method comprising the steps of:

rotating said cutterhead (9) at a substantially constant rotational speed above a predetermined threshold;

initially moving said sharpening means (15) back and forth along said path at a first speed ratio versus said cutterhead speed; and subsequently moving said sharpening means (15) at least once along said path at a second speed ratio versus said cutterhead speed.

2. A sharpening method according to claim 1, wherein said first speed ratio is substantially larger than said second speed ratio.

3. A sharpening method according to claim 1, wherein it comprises the further step of:

halting said sharpening means (15) in a home position next to said cutterhead (9).

4. A sharpening method according to claim 3, wherein at the end of said initially moving step the sharpening means (15) are halted in said home position.

5. A sharpening method according to claim 3, wherein said subsequently moving step starts when said sharpening means (15) are in said home position and ends when said sharpening means (15) have returned to said home position.

6. A sharpening method according to claim 1, wherein said initially moving step comprises the substep of moving said sharpening means (15) towards said cutterhead (9) every one or more passages along said cutterhead (9).

7. A sharpening method according to claim 6, wherein said sharpening means (15) are moved towards said cutterhead (9) over a fixed distance towards said cutterhead (9) every one or more passages along said path.

8. A sharpening method according to claim 1, wherein said initially moving step or said subsequently moving step comprises the substep of:

monitoring the cutterhead speed and halting said sharpening means (15) in a home position when said cutterhead speed falls below said predetermined threshold speed.

9. A sharpening method according to claim 1, wherein said initially moving step or said subsequently moving step comprises the substep of:

monitoring a variable which is representative of the moving power of the moving means and halting the sharpening means (15) when the moving power falls out of a predetermined range.

10. A sharpening method according to claim 9, wherein said sharpening means (15) comprises an electrical motor (33) and said variable is the current delivered to said motor (33).

* * * * *